United States Patent
Chun et al.

(10) Patent No.: US 9,834,619 B2
(45) Date of Patent: Dec. 5, 2017

(54) MODIFIED CONJUGATED DIENE-BASED POLYMER, MODIFIED RUBBER COMPOSITION CONTAINING SAME, AND METHOD FOR PREPARING MODIFIED CONJUGATED DIENE-BASED POLYMER

(71) Applicant: LG Chem, Ltd., Seoul (KR)

(72) Inventors: Moon-Seok Chun, Daejeon (KR); Soo-Yong Lee, Daejeon (KR); Seong-Du Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/117,653

(22) PCT Filed: Jun. 10, 2015

(86) PCT No.: PCT/KR2015/005843
§ 371 (c)(1),
(2) Date: Aug. 9, 2016

(87) PCT Pub. No.: WO2015/194786
PCT Pub. Date: Dec. 23, 2015

(65) Prior Publication Data
US 2016/0355612 A1 Dec. 8, 2016

(30) Foreign Application Priority Data
Jun. 16, 2014 (KR) .................. 10-2014-0072848

(51) Int. Cl.
*C08F 2/04* (2006.01)
*C08C 19/25* (2006.01)
*C08F 236/10* (2006.01)

(52) U.S. Cl.
CPC .............. *C08C 19/25* (2013.01); *C08F 2/04* (2013.01); *C08F 236/10* (2013.01)

(58) Field of Classification Search
None
See application file for complete search history.

(56) References Cited

U.S. PATENT DOCUMENTS

| | | | | |
|---|---|---|---|---|
| 3,644,314 A * | 2/1972 | Onishi et al. | ......... | C08F 236/10 502/155 |
| 3,644,322 A * | 2/1972 | Farrer | ............ | C07F 1/02 502/157 |
| 3,652,516 A * | 3/1972 | Farrer | ............ | C08F 12/08 502/157 |
| 3,847,834 A * | 11/1974 | Dennis | ............ | C07F 1/00 260/665 R |
| 3,954,894 A * | 5/1976 | Kamienski | ............ | C08F 4/488 260/665 R |
| 4,067,917 A * | 1/1978 | Sigwalt | ............ | C07F 1/02 260/665 R |
| 4,172,190 A * | 10/1979 | Tung | ............ | C08F 4/488 260/665 R |
| 5,231,152 A * | 7/1993 | Roggeman | ............ | C08F 236/10 502/157 |
| 5,567,815 A * | 10/1996 | Hall | ............ | C07F 1/02 502/157 |
| 7,285,596 B2 * | 10/2007 | Willis | ............ | C07F 1/02 525/242 |
| 7,342,070 B2 | 3/2008 | Tsukimawashi et al. | | |
| 9,290,585 B2 * | 3/2016 | Lee | ............ | C08F 236/10 |
| 9,422,417 B1 * | 8/2016 | Lee | ............ | C08F 236/10 |
| 2002/0035294 A1 * | 3/2002 | Halasa | ............ | B60C 1/0016 564/328 |
| 2002/0198343 A1 * | 12/2002 | Willis | ............ | C08F 12/04 526/173 |
| 2004/0254301 A1 * | 12/2004 | Tsukimawashi | ............ | B60C 1/00 525/271 |
| 2007/0293620 A1 * | 12/2007 | Yan | ............ | C08C 19/44 524/528 |
| 2008/0103261 A1 * | 5/2008 | Tanaka | ............ | B60C 1/0016 525/331.9 |
| 2008/0171827 A1 | 7/2008 | Hogan et al. | | |
| 2009/0036567 A1 | 2/2009 | Oshima et al. | | |

(Continued)

FOREIGN PATENT DOCUMENTS

| | | |
|---|---|---|
| EP | 2338919 A1 | 6/2011 |
| JP | 2002317024 A | 10/2002 |
| JP | 2010111753 A | 5/2010 |
| JP | 2011219701 A | 11/2011 |
| JP | 2014043516 A | 3/2014 |
| KR | 20050091988 A | 9/2005 |
| KR | 20110018333 A | 2/2011 |
| KR | 20110070871 A | 6/2011 |
| WO | 2011125698 A1 | 10/2011 |

OTHER PUBLICATIONS

Extended Search Report from European Application No. 15809771.7, dated Nov. 30, 2016.
International Search Report from PCT/KR2015/005843, dated Sep. 22, 2015.

*Primary Examiner* — Robert S Loewe

(74) *Attorney, Agent, or Firm* — Lerner, David, Littenberg, Krumholz & Mentlik, LLP

(57) ABSTRACT

Disclosed are a method of preparing a modified conjugated diene-based polymer, a modified conjugated diene-based polymer prepared thereby, a rubber composition including the modified conjugated diene-based polymer, and a tire including the rubber composition. The method of preparing the modified conjugated diene-based polymer includes (a) polymerizing a vinyl aromatic monomer and a conjugated diene monomer through continuous solution polymerization using a multifunctional anionic polymerization initiator in the presence of a hydrocarbon solvent, thus forming an active polymer having a reactive end; and (b) coupling or linking the reactive end of the active polymer with an alkylamino alkoxy silane compound.

13 Claims, No Drawings

(56) References Cited

U.S. PATENT DOCUMENTS

| | | | |
|---|---|---|---|
| 2009/0163668 A1* | 6/2009 | Yamada | C08C 19/44 525/331.9 |
| 2010/0108213 A1 | 5/2010 | Miyazaki | |
| 2010/0130671 A1* | 5/2010 | Tadaki | B60C 1/0016 524/547 |
| 2011/0160388 A1 | 6/2011 | Tanaka et al. | |
| 2011/0172344 A1 | 7/2011 | Yoshida et al. | |
| 2011/0207847 A1* | 8/2011 | Sasaka | B60C 1/0016 523/157 |
| 2012/0101212 A1* | 4/2012 | Yoon | C07F 7/1836 524/534 |
| 2012/0165464 A1 | 6/2012 | Hogan et al. | |
| 2012/0172491 A1* | 7/2012 | Miyazaki | B60C 1/0016 523/157 |
| 2012/0270997 A1* | 10/2012 | Tanaka | B60C 1/00 524/572 |
| 2013/0023623 A1 | 1/2013 | Nakamura et al. | |
| 2013/0085228 A1* | 4/2013 | Tanaka | C08C 19/25 524/572 |
| 2013/0296481 A1* | 11/2013 | Tanaka | B60C 1/00 524/575 |
| 2013/0324667 A1* | 12/2013 | Yuasa | B60C 1/0016 525/192 |
| 2014/0163163 A1* | 6/2014 | Lee | C07D 213/16 524/575 |
| 2014/0371383 A1* | 12/2014 | Hayata | C08K 3/36 524/548 |

* cited by examiner

MODIFIED CONJUGATED DIENE-BASED POLYMER, MODIFIED RUBBER COMPOSITION CONTAINING SAME, AND METHOD FOR PREPARING MODIFIED CONJUGATED DIENE-BASED POLYMER

CROSS-REFERENCE TO RELATED APPLICATION

This application is a national phase entry under 35 U.S.C. §371 of International Application No. PCT/KR2015/005843, filed Jun. 10, 2015, which claims priority to Korean Patent Application No. 10-2014-0072848, filed Jun. 16, 2014, the disclosures of which are incorporated herein by reference.

TECHNICAL FIELD

The present invention relates to a modified conjugated diene-based polymer, a modified rubber composition comprising the same, and a method of preparing the same and, more particularly, to a modified conjugated diene-based polymer, a modified rubber composition comprising the modified conjugated diene-based polymer, and a method of preparing the modified conjugated diene-based polymer, in which the rubber component includes diene-based rubber having high tensile strength, wear resistance, and wet skid resistance, as well as improved heat build-up when mixed with silica as a reinforcing agent.

BACKGROUND ART

Recently, the demand for tires having high energy efficiency is increasing, and tire manufacturers are continually directing much effort to the development of tires having superior fuel economy to comply with the demand. Furthermore, through research into preventing the fuel economy and wet grip of tires from deteriorating is ongoing. In order to sufficiently exhibit the properties required of tires, rubber for tires must be designed to satisfy the requirements of tires.

To attain the desired properties of tires, modified rubber compositions (e.g. SSBR), resulting from modifying the end of the molecular chain of a modified conjugated diene-based polymer, are being used. The production of such compositions depends on a conventional batch polymerization process, and thus suffers from limited productivity and difficult mixing with silica as a filler for the modified rubber composition.

On the other hand, a continuous polymerization process for the production of synthetic rubber is advantageous because of high production rate and wide molecular weight distribution, thus exhibiting high processability and uniform quality. In modified rubber in which the end of the polymer chain is modified, the efficiency of modification of the end is regarded as important, but the continuous process makes it difficult to obtain high modification efficiency. This is because the growing end of the polymer chain is deactivated due to impurities contained in the continuously fed monomer and solvent.

With the goal of solving this problem, Japanese Patent Application Publication No. 2011-219701 discloses the preparation of a modified conjugated diene polymer using a multifunctional polymerization initiator, but high modification efficiency cannot be obtained in a continuous process, and only a batch polymerization process is described in the embodiments thereof.

Therefore, in the present invention, there is a need for research and development into a modified rubber composition having high modification efficiency and a method of manufacturing the same, in which the use of a multifunctional initiator makes it possible to attain modification efficiency corresponding to that of a batch process, even in a continuous process, and superior properties of the polymer and a desired rubber composition may be obtained.

DISCLOSURE

Technical Problem

Accordingly, the present invention has been made keeping in mind the above problems encountered in the related art, and an object of the present invention is to provide a method of preparing a modified conjugated diene-based polymer, which may exhibit high modification efficiency and superior processability compared to conventional continuous polymerization processes.

Technical Solution

In order to accomplish the above object, the claimed invention provides a method of preparing a modified conjugated diene-based polymer, comprising: (a) polymerizing a conjugated diene monomer or a vinyl aromatic monomer and a conjugated diene monomer through a continuous solution polymerization process using a multifunctional anionic polymerization initiator in the presence of a hydrocarbon solvent, thus forming an active polymer having a reactive end; and (b) coupling or linking the reactive end of the active polymer with an alkylamino alkoxy silane compound.

In addition, the claimed invention provides a modified conjugated diene-based polymer, which is configured such that the end of an active polymer comprising a conjugated diene monomer or a vinyl aromatic monomer and a conjugated diene monomer is modified with an alkylamino alkoxy silane compound, and which has a modification efficiency of 40 to 95%.

In addition, the present invention provides a modified conjugated diene-based polymer rubber composition comprising the modified conjugated diene-based polymer.

In addition, the present invention provides a tire comprising the modified conjugated diene-based polymer rubber composition.

Advantageous Effects

According to the present invention, the method of preparing a modified conjugated diene-based polymer can exhibit high modification efficiency compared to conventional continuous polymerization processes. Furthermore, the modified conjugated diene-based polymer can have high tensile strength, wear resistance, and wet skid resistance, as well as improved heat build-up when mixed with silica as a reinforcing agent.

BEST MODE

Hereinafter, a detailed description will be given of a method of preparing a modified conjugated diene-based polymer, a modified conjugated diene-based polymer prepared thereby, and modified rubber including the modified conjugated diene-based polymer, according to the present invention.

Intensive and thorough research into the preparation of modified conjugated diene-based polymers, carried out by the present inventors aiming to solve the problems of conventional continuous polymerization processes, including very low modification efficiency of the polymer end and poor processability and properties compared to batch polymerization processes, resulted in the finding that when using a multifunctional initiator having two or more active ends per molecule, the number of active molecules may be maintained high despite the loss of some of the active ends of the initiator, whereby the modification efficiency may be increased. Thereby, the present inventors have devised a method of preparing a modified conjugated diene-based polymer, in which a continuous polymerization process may be performed using a multifunctional initiator, ultimately increasing the modification efficiency of the polymer end and improving the processability and properties thereof.

Therefore, the method of preparing a modified conjugated diene-based polymer according to the present invention has the following features.

The method of preparing a modified conjugated diene-based polymer according to the claimed invention comprises: (a) polymerizing a conjugated diene monomer or a vinyl aromatic monomer and a conjugated diene monomer through a continuous solution polymerization process using a multifunctional anionic polymerization initiator in the presence of a hydrocarbon solvent, thus forming an active polymer having a reactive end; and (b) coupling or linking the reactive end of the active polymer with an alkylamino alkoxy silane compound.

In (a) of the method of preparing the modified conjugated diene-based polymer according to the present invention, a conjugated diene monomer or a vinyl aromatic monomer and a conjugated diene monomer may be subjected to continuous solution polymerization using a multifunctional anionic polymerization initiator in the presence of a hydrocarbon solvent, thus forming an active polymer having a reactive end.

In the method of preparing the modified conjugated diene-based polymer according to the present invention, a homopolymer may be obtained by polymerizing the conjugated diene monomer alone, or an active polymer may be obtained by copolymerizing the vinyl aromatic monomer and the conjugated diene monomer.

The conjugated diene monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene. The conjugated diene monomer may be used in an amount of 60 to 100 wt %, preferably 60 to 85 wt %, and more preferably 60 to 80 wt %, based on 100 wt % in total of the conjugated diene monomer and the aromatic vinyl monomer. When the conjugated diene monomer is used in an amount of 100 wt % based on 100 wt % in total of the conjugated diene monomer and the aromatic vinyl monomer, an active polymer, resulting from polymerizing the conjugated diene monomer alone, without the aromatic vinyl monomer, is provided.

The vinyl aromatic monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. Preferably useful is styrene or α-methylstyrene. The vinyl aromatic monomer may be used in an amount of 0 to 40 wt %, preferably 15 to 40 wt %, and more preferably 20 to 40 wt %, based on 100 wt % in total of the conjugated diene monomer and the aromatic vinyl monomer. When the vinyl aromatic monomer is used in an amount of 0 wt % based on 100 wt % in total of the conjugated diene monomer and the aromatic vinyl monomer, an active polymer, resulting from polymerizing the conjugated diene monomer alone, without the aromatic vinyl monomer, is provided.

The hydrocarbon may include at least one selected from the group consisting of n-pentane, n-hexane, n-heptane, isooctane, cyclohexane, toluene, benzene, and xylene.

In a) of the method of preparing the modified conjugated diene-based polymer according to the present invention, the multifunctional anionic polymerization initiator may include an organo-alkali metal compound having two or more organometals that may be dissolved in a hydrocarbon solvent, and is preferably exemplified by a multi-lithium compound. The multi-lithium compound may be prepared by linking a polyvinyl aromatic compound with an organolithium compound, and may include, for example, at least one selected from the group consisting of 1,1-diphenylethylene (DPE) dimer, 1,3-divinylbenzene (DVB), 1,3-bis(1-phenylethenyl) benzene (PEB), 1,3-diisopropenylbenzene (DIB), 2,6-lutidine, and 1-bromo-4-(4'-bromophenoxy)-2-pentadecyl benzene.

Among the examples of the multi-lithium compound, 1,1-diphenylethylene (DPE) dimer may be prepared by subjecting lithium powder to radical anionic coupling using a hydrocarbon solvent containing anisole.

Among the examples of the multi-lithium compound, 1,3-divinylbenzene (DVB), 1,3-bis(1-phenylethenyl)benzene (PEB), 1,3-diisopropenylbenzene (DIB), 2,6-lutidine, and 1-bromo-4-(4'-bromophenoxy)-2-pentadecyl benzene may be prepared by substituting a compound having two or more double bonds per molecule with a metal initiator such as butyllithium. As such, it should be noted that they have low ceiling temperatures so as to prevent the polymerization thereof.

The amount of the multifunctional initiator is not particularly limited, and may be variously adjusted depending on the desired molecular weight of the modified conjugated diene-based polymer that is to be prepared.

The molar ratio of the multifunctional initiator and a modifier, as will be described later, may range from 1:0.1 to 1:10, or 1:0.5 to 1:2.

In the method of preparing the modified conjugated diene-based polymer according to the present invention, the polymerizing in a) may be performed with the additional use of a polar additive.

The polar additive may be a base, or may include ether, amine or mixtures thereof. Specifically, it may be selected from the group consisting of tetrahydrofuran, ditetrahydrofurylpropane, diethylether, cycloamylether, dipropylether, ethylenedimethylether, ethylenedimethylether, diethyleneglycol, dimethylether, tert-butoxyethoxyethane bis(2-dimethylaminoethyl)ether, (dimethylaminoethyl)ethylether, trimethylamine, triethylamine, tripropyl amine, and tetramethylethylenediamine. Preferably useful is ditetrahydropropylpropane, triethylamine, or tetramethylethylenediamine.

The polar additive may be used in an amount of 0.001 to 50 g, 0.001 to 10 g, 0.005 to 1 g, or 0.005 to 0.1 g, based on 100 g in total of the added conjugated diene monomer and vinyl aromatic monomer.

The polar additive may be used in an amount of 0.001 to 10 g, 0.005 to 1 g, or 0.005 to 0.1 g, based on 1 mmol in total of the added multifunctional anionic polymerization initiator.

When the conjugated diene monomer and the vinyl aromatic monomer are copolymerized, a block copolymer may be easily prepared due to the difference in the reaction rates therebetween. However, when the polar additive is added, the low reaction rate of the vinyl aromatic compound may be increased to thus obtain the microstructure of the corresponding copolymer, for example, a random copolymer.

The active polymer, obtained in (a), may be a homopolymer composed exclusively of the conjugated diene monomer, or a random copolymer comprising the conjugated diene monomer and the vinyl aromatic monomer, or a random copolymer resulting from anionic polymerization of the conjugated diene monomer and the vinyl aromatic monomer. In the active polymer, the ratio of the conjugated diene monomer and the vinyl aromatic monomer may range from 100:0 to 60:40, and the random copolymer may have a ratio of the conjugated diene monomer and the vinyl aromatic monomer ranging from 90:10 to 60:40.

Also, the polymerization in a) may be either high-temperature polymerization or room-temperature polymerization, in which high-temperature polymerization is a polymerization process that comprises adding the multifunctional initiator and then applying heat to increase the reaction temperature, and room-temperature polymerization is a polymerization process that takes place in such a way that heat is not applied after the multifunctional initiator is added.

The polymerization in a) may take place at a temperature ranging from 60 to 120° C., preferably 65 to 100° C., and more preferably 70 to 90° C.

As used herein, the active polymer having a reactive end refers to a polymer comprising a polymer anion and a metal cation, which are coupled with each other, in which the reactive end may be a lithium metal end.

In b) according to the claimed invention, the reactive end of the active polymer obtained in a) is modified through coupling or linking with the alkylamino alkoxy silane compound.

In the claimed invention, the alkylamino alkoxy silane compound may be any one of Chemical Formulas 1 to 3 below.

$$(R^1\text{—}O)_n R^2_{3-n} Si\text{—}R^3\text{-}A \qquad \text{[Chemical Formula 1]}$$

(wherein $R^1$ is a C1-C20 hydrocarbon containing at least one oxygen or nitrogen, $R^2$ and $R^3$ are C1-C20 hydrocarbons, A is amine, n is an integer of 1 to 3, two or three $R^1$s are identical to or different from each other when n is 2 or 3, and two $R^2$s are identical to or different from each other when n is 1.)

[Chemical Formula 2]

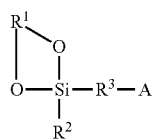

(wherein $R^1$, $R^2$ and $R^3$ are C1-C20 hydrocarbons and A is amine.)

[Chemical Formula 3]

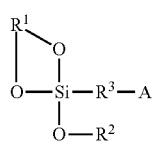

(wherein $R^1$, $R^2$ and $R^3$ are C1-C20 hydrocarbons and A is amine.)

Also, b) is performed at 60 to 120° C., preferably 65 to 100° C., and more preferably 70 to 90° C.

According to the method of preparing the modified conjugated diene-based polymer as mentioned above, a modified conjugated diene-based polymer having a modification efficiency of 40 to 95% may be prepared. As used herein, the term "modification efficiency" refers to the amount of an aggregate having a functional group component in the modified conjugated diene-based polymer.

The modified conjugated diene-based polymer, prepared by the above method, may have a single peak in the molecular weight range from 10,000 to 10,000,000 g/mol when analyzed using gel permeation chromatography (GPC). As such, the molecular weight distribution of the single peak is 1.5 or more.

The method of preparing the modified conjugated diene-based polymer according to the present invention is performed using a continuous solution polymerization process, which is not limited so long as it is typically useful in the art, and preferably a polymerization process using at least one reactor.

In addition, the present invention addresses a modified conjugated diene-based polymer.

The modified conjugated diene-based polymer may be prepared by the method of preparing the modified conjugated diene-based polymer according to the present invention.

The modified conjugated diene-based polymer may be configured such that the end of the polymer comprising a conjugated diene monomer is modified with an aminosiloxane compound, or such that the end of the random copolymer comprising a conjugated diene monomer and a vinyl aromatic monomer is modified with an aminosiloxane compound. The modified conjugated diene-based polymer may have a modification efficiency of 40 to 95%. The modified conjugated diene-based polymer according to the present invention, which is obtained through a continuous polymerization process using a multifunctional initiator, may have a high modification efficiency of 40 to 95%, compared to conventional modified conjugated diene-based polymers prepared by typical continuous polymerization processes using n-butyllithium.

Also, the modified conjugated diene-based polymer according to the present invention may have a single peak in the molecular weight range from 10,000 to 10,000,000 g/mol when analyzed using GPC. As such, the molecular weight distribution of the single peak is 1.5 or more. Based on the results of GPC analysis, in a batch polymerization process, the molecular weight distribution of a plurality of peaks is 1.5 or more, and the molecular weight distribution of a single peak is less than 1.5. In the present invention, however, since the molecular weight distribution of the single peak is 1.5 or more as measured by GPC, the modified conjugated diene-based polymer according to the present invention may be found to result from a continuous solution polymerization process.

In the modified conjugated diene-based polymer, the conjugated diene monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene. The conjugated diene monomer may be used in an amount of 60 to 100 wt %, preferably 60 to 85 wt %, and more preferably 60 to 80 wt %, based on 100 wt % in total of the conjugated diene monomer and the aromatic vinyl monomer. When the conjugated diene monomer is used in an amount of 100 wt % based on 100 wt % in total of the conjugated diene monomer and the aromatic vinyl monomer, a homopolymer, resulting from polymerizing the conjugated diene monomer alone, without the aromatic vinyl monomer, is provided.

The modified conjugated diene-based polymer may be configured such that the end of the polymer comprising a conjugated diene monomer is modified with an alkylamino alkoxy silane compound, or such that the end of the random copolymer comprising a conjugated diene monomer and a vinyl aromatic monomer is modified with an alkylamino alkoxy silane compound. The modified conjugated diene-based polymer may have a modification efficiency of 40 to 95%. The modified conjugated diene-based polymer according to the claimed invention, which is obtained through a continuous polymerization process using a multifunctional initiator, may have a high modification efficiency of 40 to 95%, compared to conventional modified conjugated diene-based polymers prepared by typical continuous polymerization processes using n-butyl lithium.

In the modified conjugated diene-based polymer according to the present invention, the random copolymer comprising the conjugated diene monomer and the vinyl aromatic monomer may have a ratio of the conjugated diene monomer and the vinyl aromatic monomer ranging from 90:10 to 60:40.

In the modified conjugated diene-based polymer according to the claimed invention, the alkylamino alkoxy silane compound may be any one of Chemical Formulas 1 to 3 below.

$(R^1-O)_n R^2{}_{3-n}Si-R^3-A$      [Chemical Formula 1]

(wherein $R^1$ is a C1-C20 hydrocarbon containing at least one oxygen or nitrogen, $R^2$ and $R^3$ are C1-C20 hydrocarbons, A is amine, n is an integer of 1 to 3, two or three $R^1$s are identical to or different from each other when n is 2 or 3, and two $R^2$s are identical to or different from each other when n is 1.)

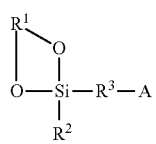

[Chemical Formula 2]

(wherein $R^1$, $R^2$ and $R^3$ are C1-C20 hydrocarbons, and A is amine)

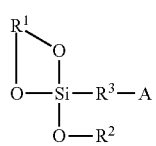

[Chemical Formula 3]

(wherein $R^1$, $R^2$ and $R^3$ are C1-C20 hydrocarbons, and A is amine)

In addition, the present invention addresses a modified conjugated diene-based polymer rubber composition comprising the modified conjugated diene-based polymer described above.

The modified conjugated diene-based polymer rubber composition may further comprise an additional conjugated diene-based polymer.

Examples of the additional conjugated diene-based polymer may include SBR (styrene-butadiene rubber), BR (butadiene rubber), natural rubber, and mixtures thereof.

SBR may be exemplified by SSBR (solution styrene-butadiene rubber).

The modified conjugated diene-based polymer rubber composition may include 20 to 90 wt % of the modified conjugated diene-based polymer based on the total weight of the composition.

The modified conjugated diene-based polymer rubber composition may comprise 0.1 to 200 parts by weight of an inorganic filler based on 100 parts by weight of the modified conjugated diene-based polymer. The inorganic filler may include carbon black, silica or a mixture thereof. Preferably useful is silica. When silica is mixed with the modified conjugated diene-based polymer, dispersibility is significantly increased, and the end of the modified conjugated diene-based polymer of the invention may be coupled (sealed) with silica particles, thus significantly decreasing hysteresis loss.

Also, the modified conjugated diene-based polymer rubber composition may further comprise oil. The oil may be exemplified by mineral oil or softening oil. The oil may be used in an amount of 1 to 100 parts by weight, based on 100 parts by weight of the modified conjugated diene-based polymer. Given the above oil content range, desired properties may be exhibited, and the rubber composition may be appropriately softened, thus increasing processability.

The modified conjugated diene-based polymer rubber composition may be used to manufacture, for example, a tire or a tire tread.

According to the present invention, a tire is manufactured using the modified conjugated diene-based polymer rubber composition.

A better understanding of the present invention may be obtained via the following examples, which are merely set forth to illustrate the present invention, and those skilled in the art will appreciate that various changes and modifications are possible, without departing from the scope and spirit of the invention as disclosed in the accompanying claims.

MODE FOR INVENTION

EXAMPLES

Synthesis Example: Preparation of Multifunctional Anionic Polymerization Initiator (t-buLi/1,3-Diisopropylbenzene Adduct)

A 1 L reactor with a stirrer and a jacket was preliminarily dried with nitrogen, after which triethylamine (47.5 g, 99.5%, 0.467 mol), t-BuLi (332.5 g, 18%, 0.934 mol), and cyclohexane (466.6 g) were sequentially placed in the reactor cooled to −5° C., followed by stirring. The resulting mixture was added with 1,3-diisopropenylbenzene (76.2 g, 97%, 0.467 mol). Thereafter, the mixture was stirred at room temperature for 2 hr, yielding a multifunctional initiator (922.8 g, 14.5%).

Preparation of Modified Conjugated Diene-Based Polymer

Example 1

Three 10 L reactors with stirrers and jackets were connected in series and dried with nitrogen, after which butadiene at 318 g/hr, styrene at 183 g/hr, hexane at 2500 g/hr, and a polar material, TMEDA, at 0.76 g/hr, were placed in the first reactor without impurities. The multifunctional anionic polymerization initiator obtained in Synthesis Example was fed at 0.947 g/hr based on lithium content into the reactor. Here, the temperature inside the reactor was maintained at 80° C. After the initiation of the reaction, the temperature inside the reactor began to rise due to the heat generated due to the polymerization, and thus the final temperature inside the reactor was 80° C. While passing through the second reactor, the monomers were consumed in amounts of 99% or more, and a modifier, namely 3-(2-ethoxy-5,5-dimethyl-1,3,2-dioxasilinan-2-yl)-N,N-dimethylpropan-1-amine (Compound A) was fed at 2.5 g/hr into the third reactor, and the modification was carried out at a temperature of 80° C. The polymer solution output from the third reactor was added with an antioxidant (2,6-di-t-butyl-p-cresol: BHT) at 6.3 g/hr, and the solvent was removed through steam stripping, followed by drying in an oven, yielding a styrene-butadiene copolymer having a modified component.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Example 2

A styrene-butadiene copolymer was obtained in the same manner as in Example 1, with the exception that 3-(7-(2-ethoxyethoxy)-3,6,8,11-tetraoxa-7-silatridecan-7-yl)-N,N-diethylpropan-1-amine (Compound B) was used as the modifier, in lieu of Compound A.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Example 3

Three 10 L reactors with stirrers and jackets were connected in series and dried with nitrogen, after which butadiene at 318 g/hr, styrene at 183 g/hr, hexane at 2500 g/hr, and a polar material, TMEDA, at 1.63 g/hr, were placed in the first reactor without impurities. The multifunctional anionic polymerization initiator obtained in Synthesis Example was fed at 1.353 g/hr based on lithium content into the reactor. Here, the temperature inside the reactor was maintained at 80° C. After the initiation of the reaction, the temperature inside the reactor began to rise due to the heat generated due to the polymerization, and thus the final temperature inside the reactor was 80° C. While passing through the second reactor, the monomers were consumed in amounts of 99% or more, and a modifier, namely Compound A, was fed at 3.5 g/hr into the third reactor, and the modification was carried out at a temperature of 80° C.

The polymer solution output from the third reactor was added with an antioxidant (2,6-di-t-butyl-p-cresol: BHT) at 6.3 g/hr, and the solvent was removed through steam stripping, followed by drying in an oven, yielding a styrene-butadiene copolymer having a modified component.

Based on the results of analysis of the amounts of bound styrene monomer and vinyl of the copolymer using a Varian VNMRS 500 Mhz NMR, the amount of bound styrene was 28 mass % and the amount of bound butadiene was 72 mass %. Also, the amount of bound 1,2-vinyl of the microstructure in the butadiene was 38% relative to the total butadiene chain, based on the calculated results, rather than the results of measurement using an IR spectrophotometer.

Example 4

A styrene-butadiene copolymer was obtained in the same manner as in Example 1, with the exception that 3-(2-ethyl-5,5-dimethyl-1,3,2-dioxasilinan-2-yl)-N,N-dimethylpropan-1-amine (Compound C) was used as the modifier, in lieu of Compound A.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Comparative Example 1

A 10 L batch reactor with a stirrer and a jacket was dried with nitrogen, after which 777 g of butadiene, 273 g of styrene, 4800 g of hexane, and 0.85 g of a polar material, TMEDA, were placed in the first reactor without impurities, and the temperature inside the reactor was maintained at 50° C. Also, n-butyllithium, as a polymerization initiator, was fed into the reactor in an amount of 0.5 g based on solid content. After the initiation of the reaction, the temperature inside the reactor began to rise due to the heat generated due to the polymerization, and thus the final temperature inside the reactor was 80° C. After completion of the polymerization, 5.25 mmol of Compound A as the modifier was added into the reactor, and the modification was carried out for 5 min. The resulting polymer solution was added with 2.1 g of an antioxidant (2,6-di-t-butyl-p-cresol: BHT), and the solvent was removed through steam stripping, followed by drying in an oven, yielding a styrene-butadiene copolymer having a modified component.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Comparative Example 2

A styrene-butadiene copolymer was obtained in the same manner as in Example 2, with the exception that n-butyllithium was added at 0.21 g/hr as the initiator, into the reactor.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Comparative Example 3

A styrene-butadiene copolymer having a modified component was obtained in the same manner as in Comparative Example 1, with the exception that 5.25 mmol of Compound B was added as the modifier.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Comparative Example 4

A styrene-butadiene copolymer having a modified component was obtained in the same manner as in Comparative Example 2, with the exception that Compound B was used as the modifier.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Comparative Example 5

A styrene-butadiene copolymer having a modified component was obtained in the same manner as in Comparative Example 1, with the exception that the initiator was added in an amount of 1.892 g.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Comparative Example 6

A styrene-butadiene copolymer having a modified component was obtained in the same manner as in Comparative Example 5, with the exception that Compound B was used as the modifier.

Based on the results of analysis of the amounts of bound styrene monomer and vinyl of the copolymer using a Varian VNMRS 500 Mhz NMR, the amount of bound styrene was 36 mass % and the amount of bound butadiene was 64 mass %. Also, the amount of bound 1,2-vinyl of the microstructure in the butadiene was 26% relative to the total butadiene chain, based on the calculated results, rather than the results of measurement using an IR spectrophotometer.

Test Example

The modified conjugated diene-based polymers of the examples and comparative examples were measured for Mooney viscosity, modification efficiency, molecular weight distribution via GPC, RR, wet grip, and processability. The results are shown in Table 1 below.

1. Measurement of Mooney Viscosity

The viscosity of rubber was measured using a Mooney viscometer (ALPHA Technologies, Mooney MV 2000). For this, a rubber sample weighing 25 to 30 g was measured at 100° C. using a large rotor with a preheating time of 1 min and a testing time of 4 min [$ML_{1+4}$(100° C.)].

2. Measurement of Modification Efficiency

The modification efficiency was measured using a bound rubber measurement method. Specifically, about 0.2 g of the mixture, resulting from secondary kneading, was cut to the shape of a cube, one side of which was 1 mm, placed in a 100-mesh screen box to measure the weight thereof, immersed in toluene for 24 hr, and dried, after which the weight thereof was measured.

The amount of filler-bound rubber was calculated from the amount of the component that was not dissolved but remained, thus determining the ratio of filler-bound rubber relative to the amount of rubber in the first mixture. The value thus determined was used as the modification efficiency.

A more detailed description thereof is as follows.

1) A cubic box having a volume of 1 cm$^3$ (1 cm×1 cm×1 cm) was made of a 100-mesh stainless steel screen. The weight thereof was accurately measured to the third decimal place (Wo).

2) About 1 g of a cured rubber sample was uniformly cut to a size of 1 mm×1 mm×1 mm, and then the weight thereof was accurately measured to the third decimal place (W1).

3) The rubber sample was carefully placed in the cubic mesh box and then covered with a lid so as to prevent the loss of the sample.

4) 1000 cc of toluene was placed in a 2 L glass bottle (having a rectangular parallelepiped shape), and the mesh box containing the sample was immersed in the toluene bottle. The sample box was located at a central position in the solution.

5) The sample immersed in the solution was allowed to stand for 14 days. Here, care was taken to avoid stirring the solution due to the transfer or shaking of the bottle.

6) After 14 days, the mesh box containing the sample was taken out of the solution and then dried in a vacuum oven at 140° C. for 35 min.

7) The weight of the dried sample (mesh box+sample) was measured (W2).

8) (W2−Wo) was calculated, thus determining the amount of the sample remaining after extraction (W3).

9) The amount of rubber and the amount of inorganic material contained in W1 were calculated (the amounts of rubber and inorganic filler contained in 1 g of compound were calculated using the mixing recipe).

(Theoretical rubber amount=W4, Theoretical inorganic amount=W5)

10) The amount of B-rubber was calculated.

$$B\text{-rubber }\% = [(W3-W5)/(W4)]*100$$

3. Molecular Weight (Mw, Mn) and Polydispersity Index (PDI)

The molecular weight (Mw: weight average molecular weight, Mn: number average molecular weight) and polydispersity index (PDI: Mw/Mn) were measured using GPC (Gel Permeation Chromatography). GPC was performed using equipment including a Waters 2707 autosampler, a Waters 2414 Refractive index detector, and a Waters 1515 Isocratic HPLC pump. The developing solvent for GPC was prepared by adding tetrahydrofuran (THF, Fisher T425-4) with 2 wt % of TMEDA (Tetramethylethylenediamine). The sample (formed by dissolving 4 mg of the polymer in 4 mL of THF) was prepared through complete dissolution using a stirrer. The sample thus prepared was fed using an automatic sampler at a flow rate of 1 ml/min. As such, the temperatures inside and outside the column were 40° C. The total analysis time per sample was 45 min, and information for Mn, Mw, and PDI was collected from the acquired data through Waters analysis programs.

4. Rolling Resistance (RR) and Wet Grip

The RR and wet grip of rubber were measured using DMTS (Dynamic mechanical thermal spectrometry; GABO, EPLEXOR 500N). The measurement conditions were as follows: frequency: 10 Hz, strain (static strain: 3%, dynamic strain: 0.25%), and temperature: −60 to 70° C. As such, RR was determined based on Tan δ at 60° C., and wet grip was determined based on Tan δ at 0° C.

5. Processability

The processability of rubber was measured by qualitatively analyzing the stirring properties of rubber and mixture upon vulcanization in a stirrer (Banbury® Mixer) and the workability in a roll mill after stirring. The stirring properties in the stirrer were determined based on the state of stirred rubber, and were evaluated to be poor when the amount of rubber powder increased. The workability in the roll mill was evaluated to be poor when the amount of rubber powder increased, and the processability was evaluated to be good when bagging, caused by poor adhesion, decreased, and was analyzed based on the shape of roll-milled vulcanized rubber (i.e. whether the lateral side of rubber was in a uniform straight line).

6. Measurement of DL Content of Initiator

The DL content of the initiator was measured using GPC (Gel Permeation Chromatography). GPC was performed using equipment that included a Waters 2707 autosampler, a Waters 2414 Refractive index detector, and a Waters 1515 Isocratic HPLC pump. The developing solvent for GPC was tetrahydrofuran (THF, Fisher T425-4).

TABLE 1

| | Ex. 1 | Ex. 2 | Ex. 3 | Ex. 4 | C. Ex. 1 | C. Ex. 2 | C. Ex. 3 | C. Ex. 4 | C. Ex. 5 | C. Ex. 6 |
|---|---|---|---|---|---|---|---|---|---|---|
| Initiator | MFI 0.947 g/hr | MFI 0.947 g/hr | MFI 1.35 g/hr | MFI 1.35 g/hr | NBL 0.5 g | NBL 0.21 g/hr | NBL 0.5 g | NBL 0.21 g/hr | MFI 1.892 g | MFI 1.892 g |
| Modifier | A | B | A | C | A | A | B | B | A | B |
| Polymerization | Cont. | Cont. | Cont./ Low MW | Cont. | Batch | Cont. | Batch | Cont. | Batch | Batch |
| Mooney viscosity | 88 | 85 | 69 | 69 | 87 | 86 | 88 | 90 | 85 | 87 |
| Modification efficiency | 90 | 90 | 92 | 92 | 90 | 20 | 85 | 15 | 90 | 90 |
| PDI | 2.5 | 2.3 | 2.2 | 2.2 | 1.5 | 2.1 | 1.4 | 2.1 | 1.5 | 1.5 |
| RR | 110 | 110 | 105 | 105 | 100 | 80 | 100 | 80 | — | — |
| Wet grip | 110 | 110 | 105 | 105 | 100 | 90 | 100 | 85 | — | — |
| Processability | 110 | 110 | 110 | 110 | 100 | 100 | 100 | 100 | 50 | 50 |

MFI: Multifunctional initiator

*In Comparative Examples 5 and 6, reproducible values could not be obtained for RR and wet grip because of poor processability.

As shown in Examples 1 to 4 of Table 1, when the DL initiator was used in the continuous process, high modification efficiency was obtained, as in when using the NBL initiator in the batch process in Comparative Example 1 or 3. Furthermore, Examples 1 to 4, using the continuous process, had wide PDI, thus exhibiting superior processability, RR and wet grip, compared to Comparative Examples 5 and 6, which used the batch process. However, in Comparative Examples 2 and 4, using the NBL initiator in the continuous process, low modification efficiency resulted.

In Comparative Examples 5 and 6 using the multifunctional initiator in the batch process, processability became poor, and thus properties such as RR and wet grip could not be reproducibly measured through normal mixing.

As is apparent from Table 1, in the modified conjugated diene-based polymer compositions of Examples 1 to 4, compared to the compositions of Comparative Examples 1 to 6, the amount of bound rubber was increased in the silica-mixed composition, and silica dispersibility was increased, and RR based on Tan δ at 60° C. was significantly decreased, and thus hysteresis loss was reduced, resulting in superior fuel economy. Also, wet skid resistance was good based on high Tan δ at low temperature, and fuel economy and wet skid resistance were efficiently balanced. Also, wear resistance was remarkably increased, and good tensile strength was obtained.

The invention claimed is:

1. A method of preparing a modified conjugated diene-based polymer, comprising:
    (a) polymerizing a conjugated diene monomer or a vinyl aromatic monomer and a conjugated diene monomer through continuous solution polymerization using a multifunctional anionic polymerization initiator in presence of a hydrocarbon solvent, thus forming an active polymer having a reactive end; and
    (b) coupling or linking the reactive end of the active polymer with an aminoalkyl alkoxy silane compound,
    wherein the multifunctional anionic polymerization initiator is an organo-alkali metal compound having two or more organometals,
    the modified conjugated diene-based polymer has a single peak in a molecular weight range from 10,000 to 10,000,000 g/mol when analyzed using gel permeation chromatography (GPC), and a modification efficiency of 40% to 95%, and
    the aminoalkyl alkoxy silane compound is any one of Chemical Formulas 1 to 3 below:

$(R^1-O)_n R^2_{3-n} Si-R^3-A$       [Chemical Formula 1]

wherein, in Chemical Formula 1, $R^1$ is a C1-C20 hydrocarbon containing at least one oxygen or nitrogen, $R^2$ and R3 are C1-C20 hydrocarbons, A is amine, n is an integer of 1 to 3, two or three $R^1$s are identical to or different from each other when n is 2 or 3, and two $R^2$s are identical to or different from each other when n is 1;

[Chemical Formula 2]

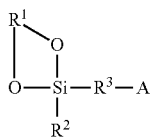

wherein, in Chemical Formula 2, $R^1$, $R^2$ and $R^3$ are C1-C20 hydrocarbons, and A is an amine;

[Chemical Formula 3]

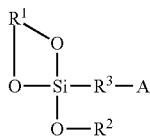

wherein, in Chemical Formula 3, $R^1$, $R^2$ and $R^3$ are C1-C20 hydrocarbons, and A is an amine.

2. The method of claim 1, wherein the active polymer is a random copolymer comprising the conjugated diene monomer and the vinyl aromatic monomer.

3. The method of claim 2, wherein the active polymer is a random copolymer resulting from anionic polymerization of the conjugated diene monomer and the vinyl aromatic monomer.

4. The method of claim 2, wherein the random copolymer has a ratio of the conjugated diene monomer and the vinyl aromatic monomer ranging from 90:10 to 60:40.

5. The method of claim 1, wherein the active polymer has a ratio of the conjugated diene monomer and the vinyl aromatic monomer ranging from 100:0 to 60:40.

6. The method of claim 1, wherein the organo-alkali metal compound having two or more metals is a multi-lithium compound, and
wherein the organo group of the multi-lithium compound comprises at least one selected from 1,1-diphenylethylene (DPE) dimer, 1,3-divinylbenzene (DVB), 1,3-bis(1-phenylethenyl)benzene (PEB), 1,3-diisopropenylbenzene (DIB), 2,6-lutidine, or 1-bromo-4-(4'-bromophenoxy)-2-pentadecyl benzene.

7. The method of claim 1, wherein the reactive end is a lithium metal end.

8. The method of claim 1, wherein the modified conjugated diene-based polymer has a single peak molecular weight distribution of 1.5 or more, as measured using GPC.

9. A modified conjugated diene-based polymer, which is configured such that an end of a random copolymer comprising a conjugated diene monomer and a vinyl aromatic monomer is modified with an aminoalkyl alkoxy silane compound,
which has a modification efficiency of 40 to 95%,
wherein the modified conjugated diene-based polymer has a single peak in a molecular weight range from 10,000 to 10,000,000 g/mol when analyzed using GPC, and
the aminoalkyl alkoxy silane compound is any one of Chemical Formulas 1 to 3 below:

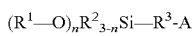 [Chemical Formula 1]

wherein, in Chemical Formula 1, $R^1$ is a C1-C20 hydrocarbon containing at least one oxygen or nitrogen, $R^2$ and R3 are C1-C20 hydrocarbons, A is amine, n is an integer of 1 to 3, two or three $R^1$s are identical to or different from each other when n is 2 or 3, and two $R^2$s are identical to or different from each other when n is 1;

[Chemical Formula 2]

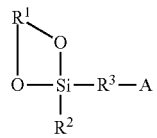

wherein, in Chemical Formula 2, $R^1$, $R^2$ and $R^3$ are C1-C20 hydrocarbons, and A is an amine;

[Chemical Formula 3]

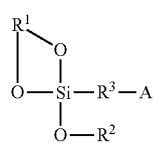

wherein, in Chemical Formula 3, $R^1$, $R^2$ and $R^3$ are C1-C20 hydrocarbons, and A is an amine.

10. The modified conjugated diene-based polymer of claim 9,
wherein the modified conjugated diene-based polymer has a single peak molecular weight distribution of 1.5 or more, as measured using GPC.

11. The modified conjugated diene-based polymer of claim 9, wherein the random copolymer has a ratio of the conjugated diene monomer and the vinyl aromatic monomer ranging from 90:10 to 60:40.

12. A modified conjugated diene-based polymer, which is configured such that an end of an active polymer comprising a conjugated diene monomer is modified with an aminoalkyl alkoxy silane compound,
which has a modification efficiency of 40 to 95%,
wherein the modified conjugated diene-based polymer has a single peak in a molecular weight range from 10,000 to 10,000,000 g/mol when analyzed using GPC, and
the aminoalkyl alkoxy silane compound is any one of Chemical Formulas 1 to 3 below:

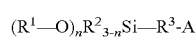 [Chemical Formula 1]

wherein, in Chemical Formula 1, $R^1$ is a C1-C20 hydrocarbon containing at least one oxygen or nitrogen, $R^2$ and R3 are C1-C20 hydrocarbons, A is amine, n is an integer of 1 to 3, two or three $R^1$s are identical to or different from each other when n is 2 or 3, and two $R^2$s are identical to or different from each other when n is 1;

[Chemical Formula 2]

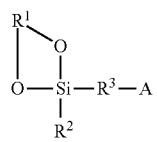

wherein, in Chemical Formula 2, $R^1$, $R^2$ and $R^3$ are C1-C20 hydrocarbons, and A is an amine;

[Chemical Formula 3]
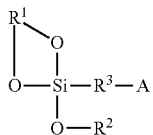
wherein, in Chemical Formula 3, $R^1$, $R^2$ and $R^3$ are C1-C20 hydrocarbons, and A is an amine.
13. The modified conjugated diene-based polymer of claim 12,
wherein the modified conjugated diene-based polymer has a single peak molecular weight distribution of 1.5 or more, as measured using GPC.
* * * * *